(12) United States Patent
Sakurai et al.

(10) Patent No.: US 7,298,924 B2
(45) Date of Patent: Nov. 20, 2007

(54) IMAGE DATA ENLARGING/REDUCING APPARATUS ENLARGING/REDUCING IMAGE DATA BY DIRECT MEMORY ACCESS TRANSFER

(75) Inventors: Tomohiro Sakurai, Hyogo (JP); Toru Kengaku, Hyogo (JP); Tatsuya Ueda, Hyogo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 725 days.

(21) Appl. No.: 10/667,354

(22) Filed: Sep. 23, 2003

(65) Prior Publication Data

US 2004/0168127 A1    Aug. 26, 2004

(30) Foreign Application Priority Data

Feb. 25, 2003    (JP)    ............................. 2003-047685

(51) Int. Cl.
*G06K 9/32*    (2006.01)
*H04N 9/74*    (2006.01)

(52) U.S. Cl. ...................................... 382/298; 348/581

(58) Field of Classification Search ................ 382/298, 382/299, 300; 348/581; 345/660, 665, 667, 345/670, 671
See application file for complete search history.

(56) References Cited

U.S. PATENT DOCUMENTS 5,754,304 A * 5/1998 Endo et al. .................. 382/298
6,141,061 A * 10/2000 Takeuchi ..................... 348/581
6,914,606 B2 * 7/2005 Amemiya et al. ........... 345/522

FOREIGN PATENT DOCUMENTS

JP    6-215123    8/1994

* cited by examiner

*Primary Examiner*—Yon J. Couso
(74) *Attorney, Agent, or Firm*—Buchanan Ingersoll & Rooney PC

(57) ABSTRACT

When a line number counted by a line number counting unit corresponds to a prescribed line number, a transfer source address generating unit adds an offset address set in an offset address setting unit to respective transfer source addresses to output as addresses to a memory. A DMA control unit controls DMA transfer in accordance with a transfer source address generated by the transfer source address generating unit and a transfer destination address generated by a transfer destination address generating unit. Thus, rapid enlargement/reduction of image data becomes possible.

3 Claims, 8 Drawing Sheets

IMAGE DATA ENLARGING/REDUCING APPARATUS ENLARGING/REDUCING IMAGE DATA BY DIRECT MEMORY ACCESS TRANSFER

BACKGROUND OF THE INVENTION

1. Field of the Invention

The present invention relates to an image data enlarging/reducing function, and more particularly to an image data enlarging/reducing apparatus preventing increases of circuit scale and development cost.

2. Description of the Background Art

In recent years, information processing equipment such as a personal computer has been widespread. One of the functions of such information processing equipment is an enlarging/reducing function of image data. Japanese Patent Laying-Open No. 6-215123 discloses a technique related thereto.

The image editing device disclosed in Japanese Patent Laying-Open No. 6-215123 enlarges/reduces an image in a horizontal direction. Upon enlargement, it reads the same line or column a plurality of times, while it skips an unnecessary line or column upon reduction. It performs data transfer collectively in a unit of block by direct memory access (DMA).

Conventionally, rapid enlargement/reduction of image data required a circuit dedicated to image data processing. Adding such a function of rapidly enlarging/reducing image data would increase the circuit scale and/or the development cost of the information processing equipment.

Further, although Japanese Patent Laying-Open No. 6-215123 described above is related to the image data enlarging/reducing technique, enlargement/reduction of the image is conducted solely in the horizontal direction. It does not disclose a technique for enlarging/reducing the image in a vertical direction.

SUMMARY OF THE INVENTION

An object of the present invention is to provide an image data enlarging/reducing apparatus capable of rapidly enlarging/reducing image data.

According to an aspect of the present invention, an image data enlarging/reducing apparatus enlarging or reducing image data stored in a first storage unit to transfer to a second storage unit includes: a counting unit which counts a line number of the image data stored in the first storage unit; a setting unit in which an offset address is set; a transfer source address generating unit which sequentially increments transfer source addresses and, when the line number counted by the counting unit corresponds to a prescribed line number, adds the offset address set in the setting unit to the respective transfer source addresses to output as addresses to the first storage unit; a transfer destination address generating unit which sequentially increments transfer destination addresses to output as addresses to the second storage unit, and a control unit which controls direct memory access transfer from the first storage unit to the second storage unit.

When the line number counted by the counting unit corresponds to a prescribed line number, the transfer source address generating unit adds the offset address set in the setting unit to the respective transfer source addresses and outputs the same as addresses to the first storage unit. The control unit controls the direct memory access transfer in accordance with the transfer source addresses and the transfer destination addresses. Accordingly, rapid enlargement/reduction of the image data becomes possible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
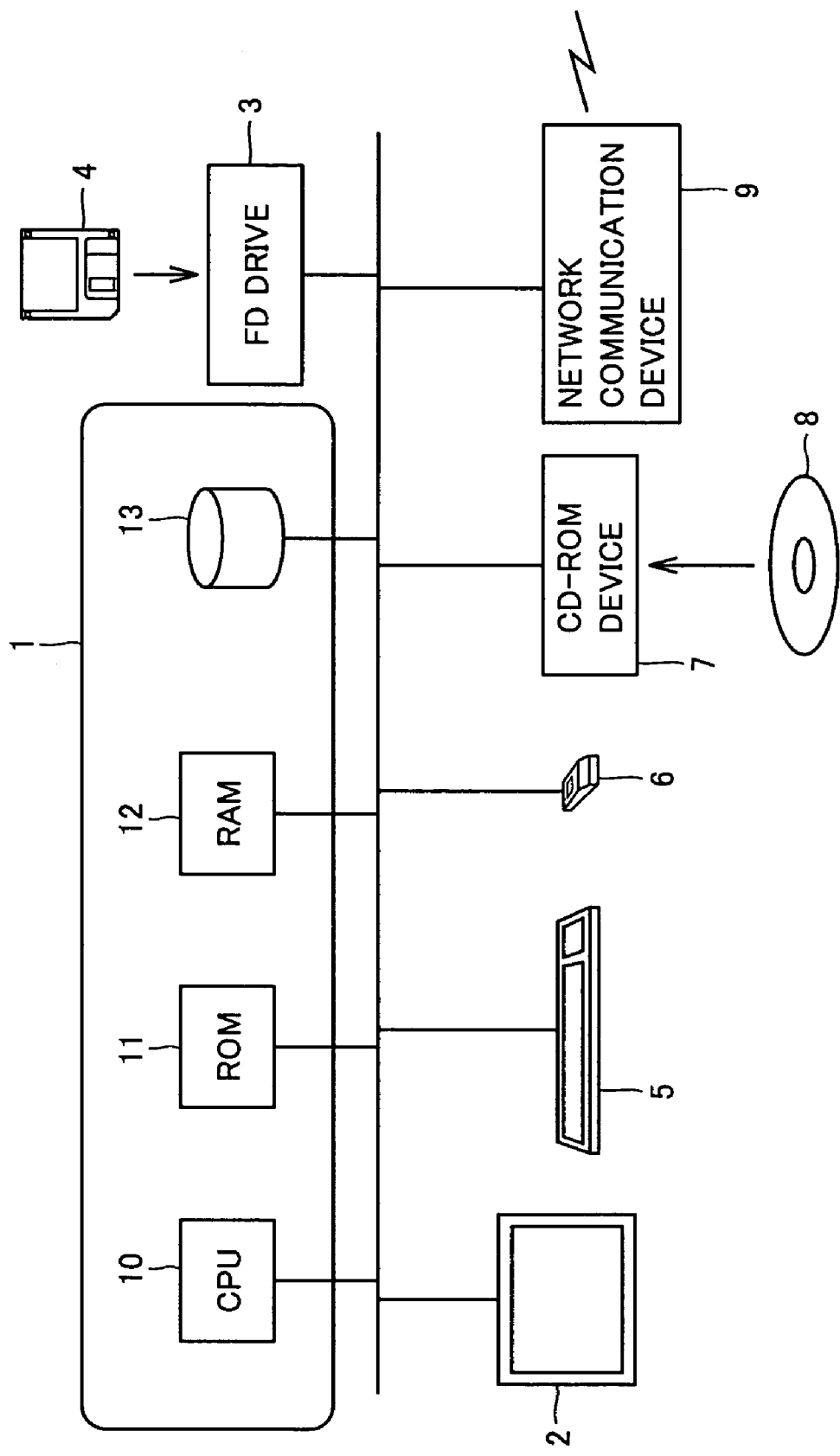
FIG. 1 is a block diagram showing a configuration of an image data enlarging/reducing apparatus according to a first embodiment of the present invention.

Referring to FIG. 1, the image data enlarging/reducing apparatus according to the first embodiment of the present invention includes a computer body 1, a display device 2, an FD (Flexible Disk) drive 3 mounted with an FD 4, a key board 5, a mouse 6, a CD-ROM (Compact Disk-Read Only Memory) device 7 mounted with a CD-ROM 8, and a network communication device 9.

A recording medium such as FD4, CD-ROM 8 or the like provides an image data enlarging/reducing program. Enlargement/reduction of the image data is carried out by computer body 1 executing the image data enlarging/reducing program. Alternatively, the image data enlarging/reducing program may be supplied to computer body 1 from another computer via network communication device 9.

Computer body 1 shown in FIG. 1 includes a CPU (Central Processing Unit) 10, a ROM (Read Only Memory) 11, a RAM (Random Access Memory) 12, and a hard disk 13. CPU 10 performs processing while inputting/outputting data with respect to display device 2, FD drive 3, key board 5, mouse 6, CD-ROM device 7, network communication device 9, ROM 11, RAM 12, or hard disk 13.

The image data enlarging/reducing program recorded on FD4 or CD-ROM 8 is temporarily stored in hard disk 13 via FD drive 3 or CD-ROM device 7 by CPU 10. CPU 10 performs enlargement/reduction of the image data by loading the image data enlarging/reducing program from hard disk 13 to RAM 12 as appropriate for execution.

Figure 2:
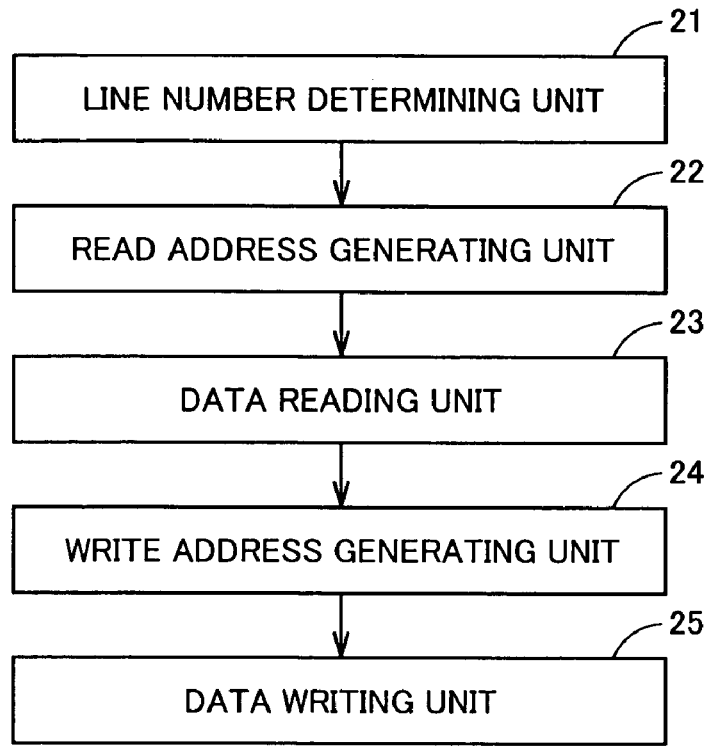
FIG. 2 is a block diagram showing a functional configuration of the image data enlarging/reducing apparatus of the first embodiment.

FIG. 2 shows a functional configuration of the image data enlarging/reducing apparatus of the first embodiment. The image data enlarging/reducing apparatus includes: a line number determining unit 21 which determines a line number when reading image data stored in a memory such as RAM 12; a read address generating unit 22 which generates a read address in accordance with the determined result of line number determining unit 21; a data reading unit 23 which reads the image data from the memory in accordance with the read address generated by read address generating unit 22; a write address generating unit 24 which generates a write address where the data read by data reading unit 23 is to be written; and a data writing unit 25 which writes the image data to the memory in accordance with the write address generated by write address generating unit 24.

Figure 3:
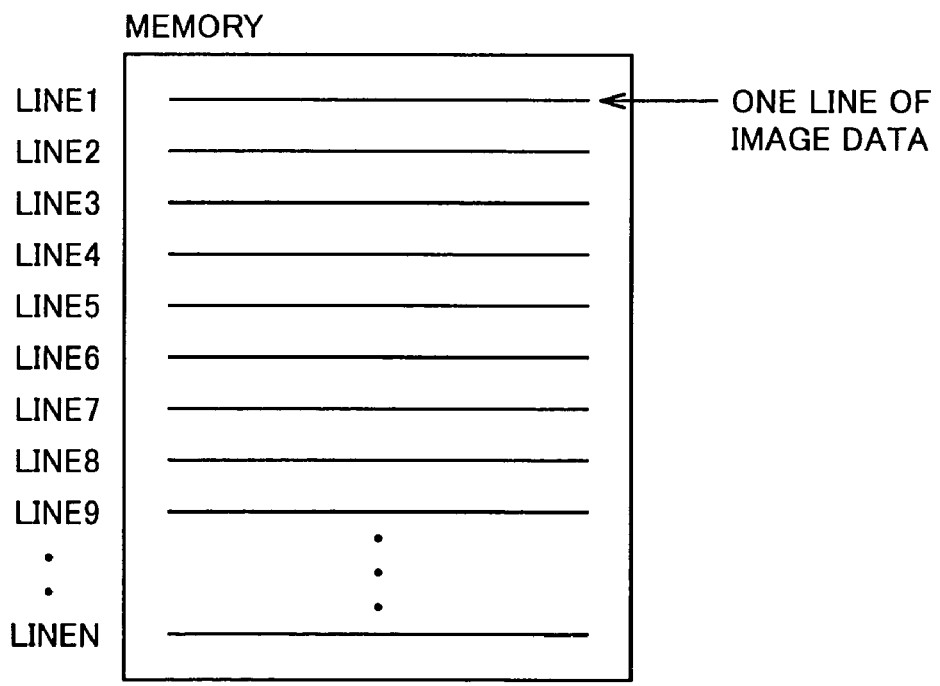
FIG. 3 shows, by way of example, image data stored in a memory.

FIG. 3 shows, by way of example, image data stored in a memory. In this example, the image data is formed of lines 1-N.

Figures 4A, 4B:
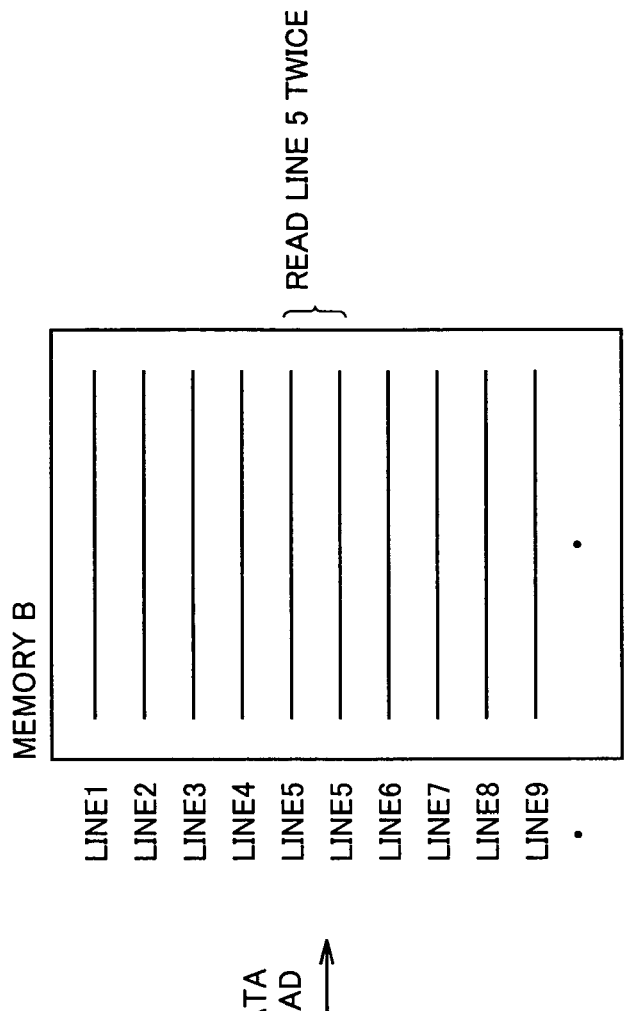
FIGS. 4A and 4B illustrate an operation of the image data enlarging/reducing apparatus of the first embodiment upon enlargement of the image data.

FIGS. 4A and 4B illustrate an operation of the image data enlarging/reducing apparatus of the first embodiment upon enlargement of image data. When image data is stored in memory A as shown in FIG. 4A, enlargement of the image data is carried out by reading a particular line a plurality of times to write to a memory B. For example, as shown in FIG. 4B, lines 5, 10, 15 . . . are each read twice for enlargement of the image data in a vertical direction.

Figure 5A:
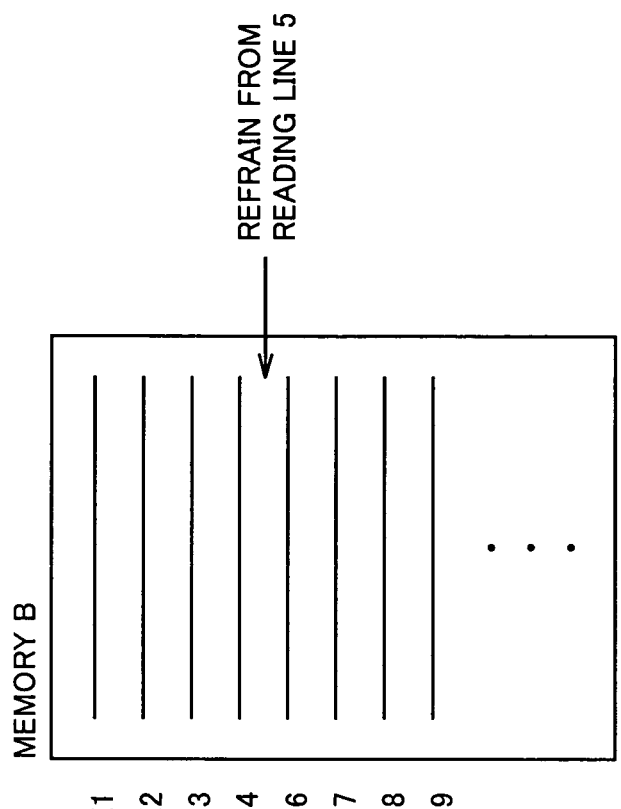
FIGS. 5A and 5B illustrate an operation of the image data enlarging/reducing apparatus of the first embodiment upon reduction of the image data.
Figure 5B:
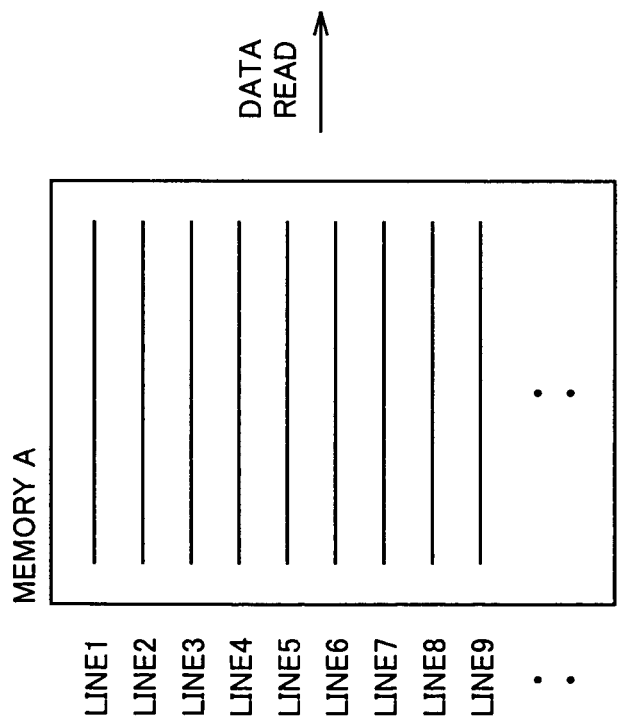

FIGS. 5A and 5B illustrate an operation of the image data enlarging/reducing apparatus of the first embodiment upon reduction of image data. When image data is stored in memory A as shown in FIG. 5A, reduction of the image data is carried out by refraining from reading a particular line. For example, as shown in FIG. 5B, lines 5, 10, 15 . . . are left unread for reduction of the image data in a vertical direction.

Figure 6:
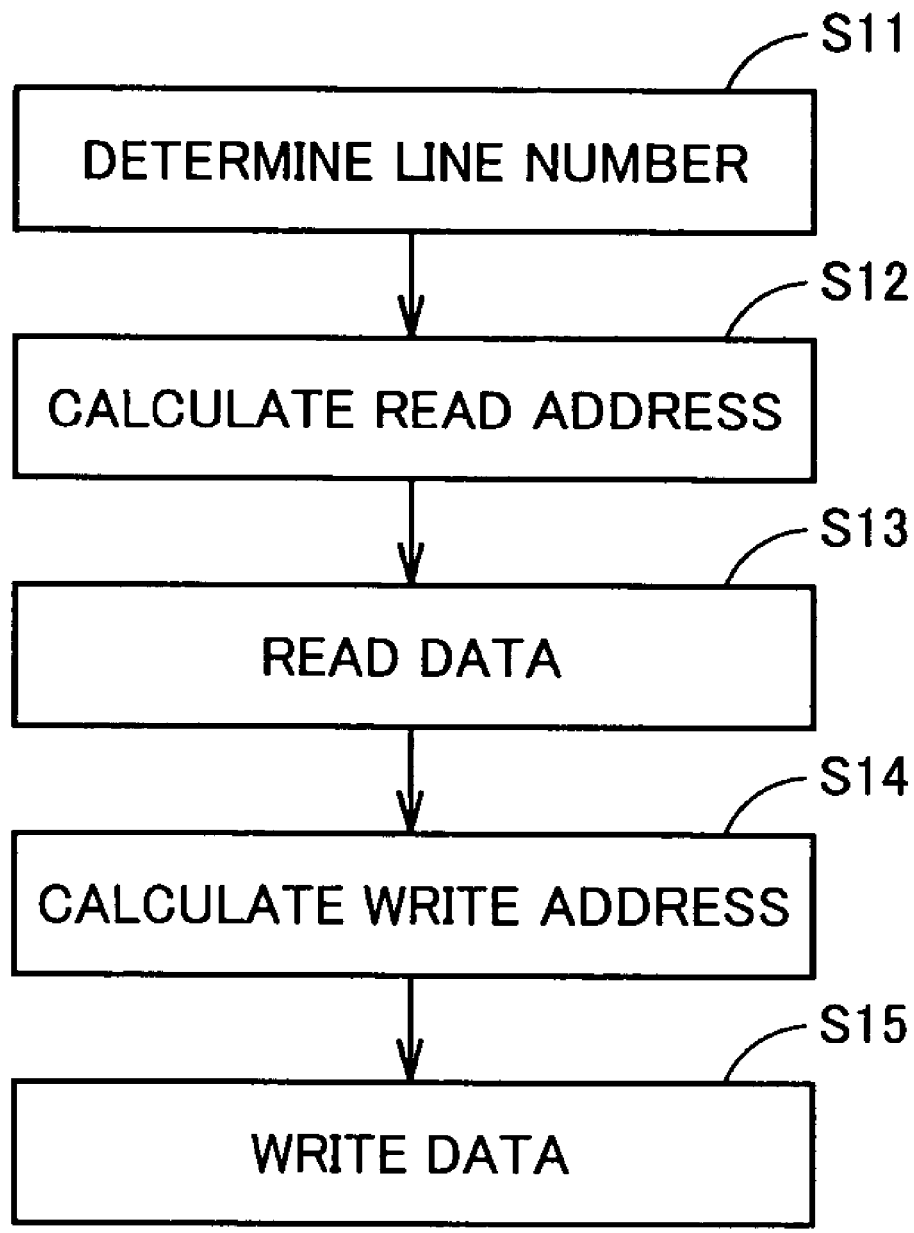
FIG. 6 is a flowchart illustrating processing procedure of the image data enlarging/reducing apparatus of the first embodiment.

FIG. 6 is a flowchart illustrating processing procedure of the image data enlarging/reducing apparatus of the first embodiment. Firstly, line number determining unit 21 determines whether the line to be read from memory A corresponds to a prescribed line (S11). For example, when image data is to be enlarged as shown in FIG. 4B, line number determining unit 21 determines whether the relevant line is a line to be read a plurality of times. When image data is to be reduced as shown in FIG. 5B, line number determining unit 21 determines whether the relevant line is a line not to be read.

Next, read address generating unit 22 calculates a read address in accordance with the determined result of line number determining unit 21 (S12). When line number determining unit 21 determines that the relevant line corresponds to the line to be read a plurality of times (for enlargement of image data), read address generating unit 22 generates a read address of the relevant line and outputs the same to data reading unit 23, and generates the read address of the same line again and outputs the same to data reading unit 23. When line number determining unit 21 determines that the relevant line is the line to be left unread (for reduction of image data), read address generating unit 22 generates, not the read address of the relevant line, but a read address of a next line and outputs the same to data reading unit 23.

Data reading unit 23 sequentially reads the image data from memory A in accordance with the read addresses generated by read address generating unit 22 (S13).

Next, write address generating unit 24 calculates write addresses for writing the data read by data reading unit 23 to memory B (S14). Write address generating unit 24 sequentially increments the write addresses and outputs the same to data writing unit 25.

Lastly, data writing unit 25 writes the image data to memory B in accordance with the write addresses generated by write address generating unit 24 (S15). The above-described processes are repeated sequentially for enlargement/reduction of the image data.

As described above, according to the image data enlarging/reducing apparatus of the present embodiment, image data on a prescribed line is read a plurality of times upon enlargement of the image data, while image data on a prescribed line is not read upon reduction of the image data. Thus, a circuit dedicated to enlargement/reduction of the image data becomes unnecessary, and the increase of circuit scale and/or development cost can be prevented.

Second Embodiment

Figure 7:
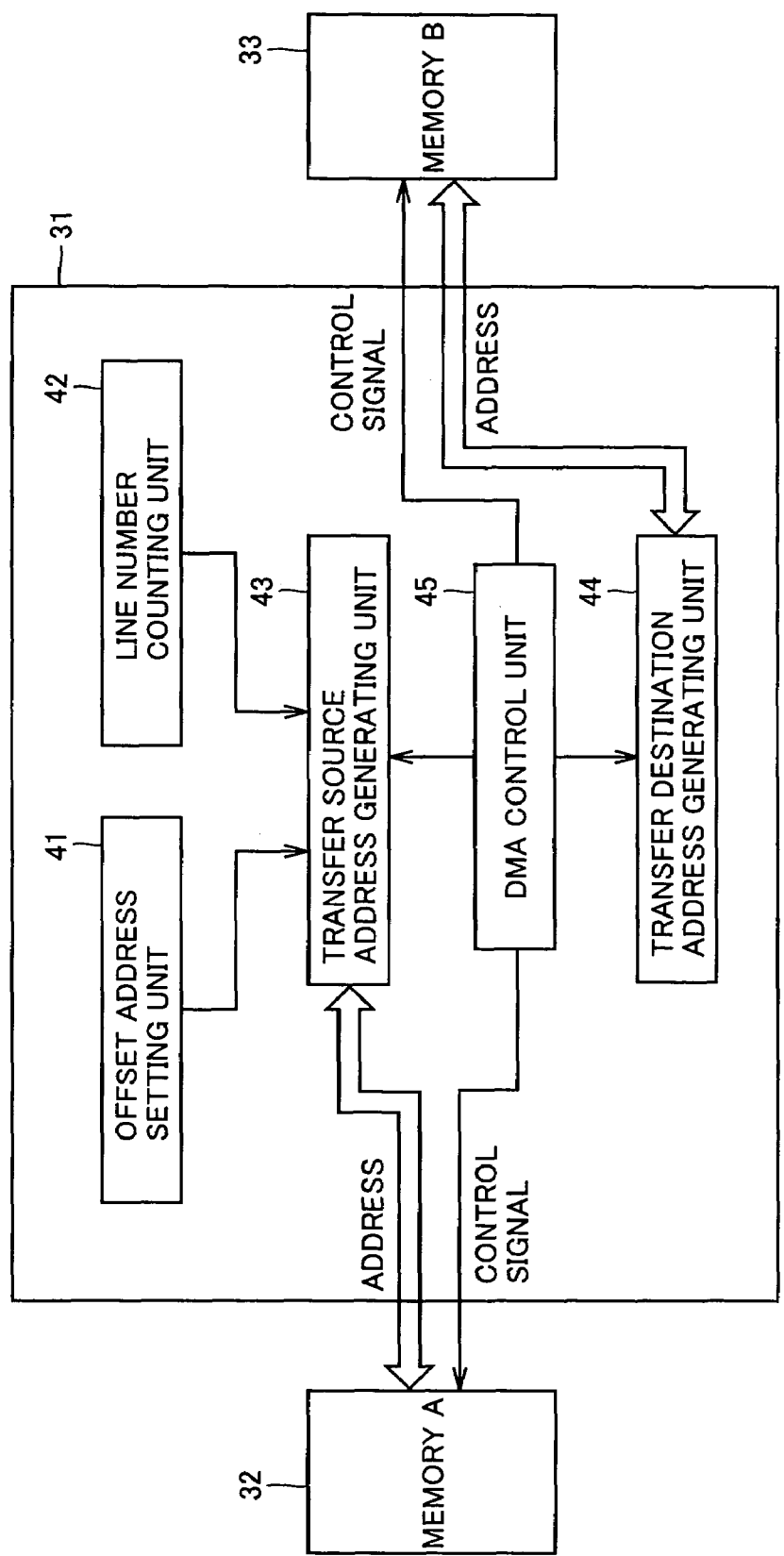
FIG. 7 is a block diagram showing a schematic configuration of an image data enlarging/reducing apparatus according to a second embodiment of the present invention.

FIG. 7 shows a schematic configuration of the image data enlarging/reducing apparatus according to the second embodiment of the present invention. The image data enlarging/reducing apparatus includes a DMA controller 31 which enlarges/reduces image data by DMA transfer, a memory A 32 which stores original image data, and a memory B 33 which stores enlarged/reduced image data.

DMA controller 31 includes an offset address setting unit 41 where an offset address is set, a line number counting unit 42 which counts a line number, a transfer source address generating unit 43 which generates a transfer source address, a transfer destination address generating unit 44 which generates a transfer destination address, and a DMA control unit 45 which controls the entire DMA controller.

Figure 8B:
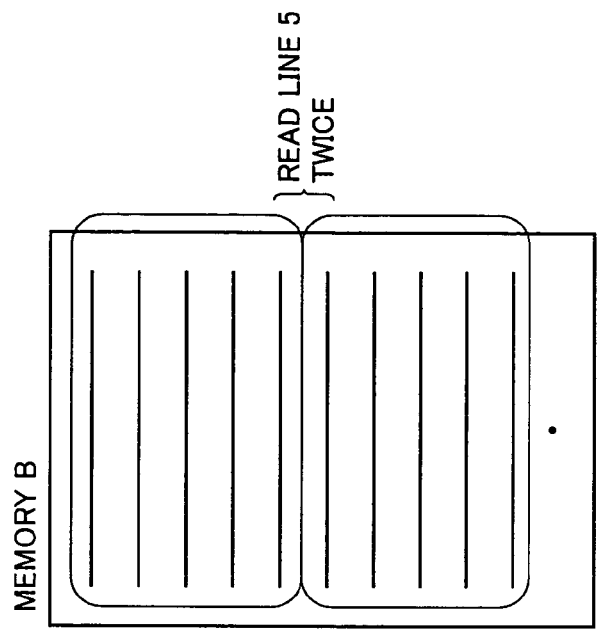
FIGS. 8A and 8B illustrate an operation of the image data enlarging/reducing apparatus of the second embodiment upon enlargement of the image data.
Figure 8A:
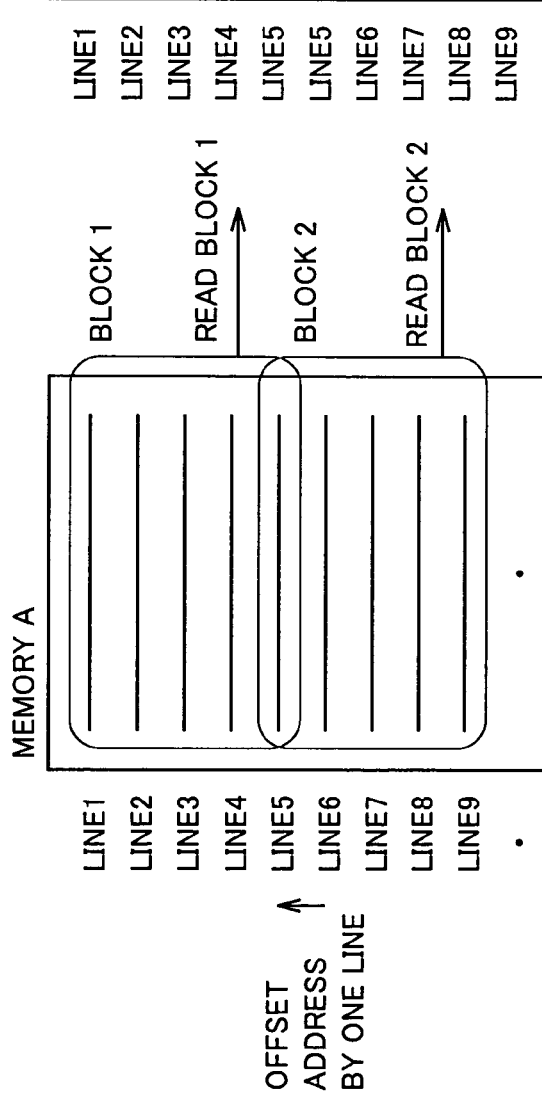

FIGS. 8A and 8B illustrate an operation of the image data enlarging/reducing apparatus of the second embodiment upon enlargement of image data. When image data is stored in memory A as shown in FIG. 8A, enlargement of the image data is carried out as follows. A block 1 (lines 1-5) stored in memory A is DMA-transferred to memory B, which is followed by DMA transfer of a block 2 (lines 5-9) stored in memory A, including a duplicate of the line included in block 1, to memory B. In this case, an offset address in a direction going back by one line (a negative address value) is set in offset address setting unit 41.

Figure 9A:
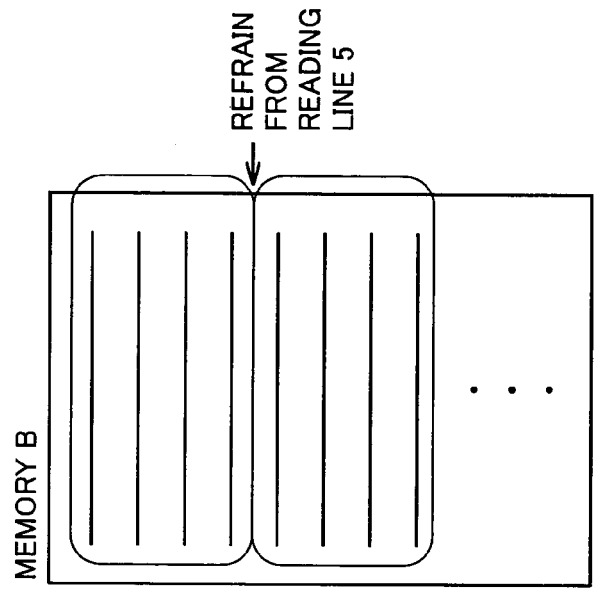
FIGS. 9A and 9B illustrate an operation of the image data enlarging/reducing apparatus of the second embodiment upon reduction of the image data.
Figure 9B:
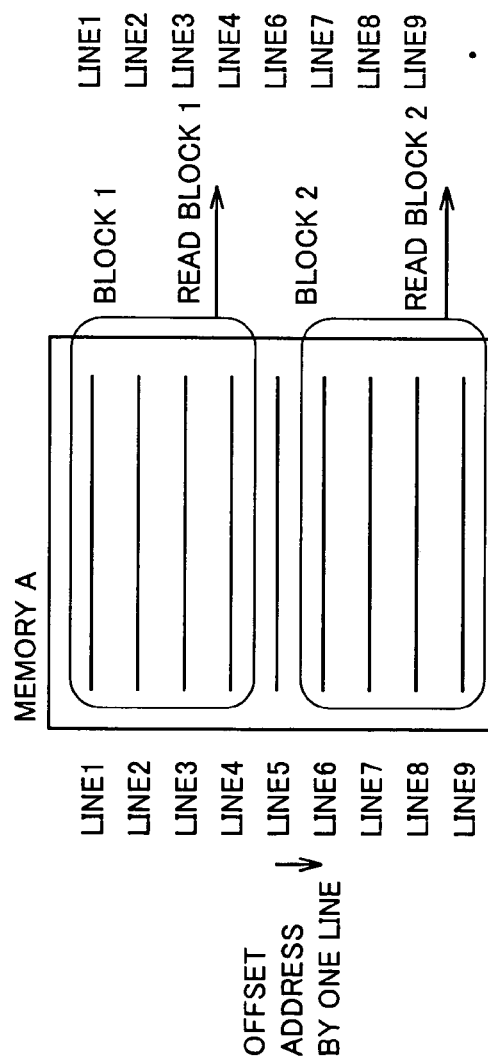

FIGS. 9A and 9B illustrate an operation of the image data enlarging/reducing apparatus of the second embodiment upon reduction of image data. When image data is stored in memory A as shown in FIG. 9A, reduction of the image data is carried out as follows. A block 1 (lines 1-4) stored in memory A is DMA-transferred to memory B, and then a block 2 (lines 6-9) spaced apart from block 1 by a prescribed line is DMA-transferred to memory B. In this case, an offset address in a direction going ahead by one line (a positive address value) is set in offset address setting unit 41.

Line number counting unit 42 counts the number of lines being subjected to the DMA transfer, and outputs the line number to transfer source address generating unit 43. When the line number output from line number counting unit 42 does not correspond to a prescribed line number, transfer source address generating unit 43 sequentially increments the transfer source addresses and outputs the same to memory A 32. When the line number output from line number counting unit 42 corresponds to the prescribed line number, transfer source address generating unit 43 adds the offset address set in offset address setting unit 41 to the respective transfer source addresses, and outputs the resultant addresses to memory A 32.

Transfer destination address generating unit 44 sequentially increments the transfer destination addresses and outputs the same to memory B 33.

DMA control unit 45 controls timings of address generation of transfer source address generating unit 43 and transfer destination address generating unit 44. It also generates control signals for memory A 32 and memory B 33 to control the DMA transfer.

As described above, according to the image data enlarging/reducing apparatus of the present embodiment, enlargement/reduction of image data is carried out by performing DMA transfer with an offset address being added to each transfer source address when the line number corresponds to a prescribed line number. This enables rapid enlargement/reduction of the image data, and also suppresses the increase of circuit scale and/or development cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data enlarging/reducing apparatus enlarging or reducing image data stored in a first storage unit to transfer to a second storage unit, comprising:

a counting unit counting a line number of the image data stored in said first storage unit;

a setting unit where an offset address is set;

a transfer source address generating unit sequentially incrementing transfer source addresses and, when the line number counted by said counting unit corresponds to a prescribed line number, adding the offset address set in said setting unit to respective said transfer source addresses to output as addresses to said first storage unit;

a transfer destination address generating unit sequentially incrementing transfer destination addresses to output as addresses to said second storage unit; and a control unit controlling direct memory access transfer from said first storage unit to said second storage unit.

2. The image data enlarging/reducing apparatus according to claim 1, wherein a negative address value is set in said setting unit upon enlargement of the image data.

3. The image data enlarging/reducing apparatus according to claim 1, wherein a positive address value is set in said selling unit upon reduction of the image data.

* * * * *